United States Patent Office 3,480,675
Patented Nov. 25, 1969

3,480,675
PREPARATION OF BIS[BETA-(N,N-DIMETHYL-AMINO)ALKYL]ETHERS
Fedor Poppelsdorf, Charleston, W. Va., assignor to Union Carbide Corporation, a corporation of New York
No Drawing. Filed Apr. 6, 1966, Ser. No. 540,502
Int. Cl. C07c 85/06, 93/04
U.S. Cl. 260—584
6 Claims

ABSTRACT OF THE DISCLOSURE

Bis[beta - (N,N-dimethylamino)alkyl] ethers are prepared by reacting a beta-(N,N - dimethylamino)alkanol with a beta-(N,N-dimethylamino)alkyl chloride (or acid salt thereof) in the presence of alkali metal hydroxide. The product ethers are useful as urethane catalysts.

---

The invention relates to an improved method for the production of bis[beta-(N,N-dimethylamino)alkyl] ethers by a modification of the classical Williamson ether synthesis.

The well known Williamson ether synthesis involves the reaction of an alkali metal alcoholate with a halide, for example:

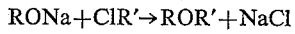

When aliphatic ethers are produced by this route, anhydrous conditions are almost always specified because of side reactions that would substantially reduce the yield of ether. Among these side reactions are the following:

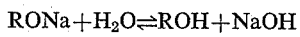

Halide that was converted into the corresponding alcohol would not be available for ether formation.

J. Fakstorp et al., in Acta Chem. Scand., 7, 138 (1953), report the preparation of bis[beta-(N,N-dimethylamino)-ethyl] ether by the classical Williamson ether synthesis route in accordance with the following equation:

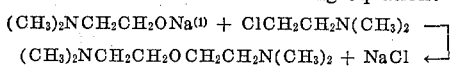

The yield of this reaction was reported to be 66 percent of impure material. (The isolated yield of pure product was 52 percent.) There are several disadvantages attendant to the use of sodium 2-(N,N-dimethylamino)ethoxide in the synthesis of said ether. First, the sodium alkoxide is a thick, difficulty stirrable gel in the toluene medium specified which makes handling difficult. Second, the methods for producing the sodium alkoxide are economically undesirable. The sodium alkoxide is made by reacting N,N-dimethylethanolamine with metallic sodium. The use of metallic sodium necessitates elaborate and expensive safety precautions which must be taken because of the hazardous nature of sodium. If sodium hydroxide were used to produce the sodium alkoxide (this would be an alternate procedure), the reaction would be slow and, because the reaction is reversible (e.g., NaOH+ROH⇌RONa+H₂O), very efficient water-removal must be carried out during the reaction in order to prevent regeneration of the alcohol. The process of the present invention makes it possible to produce bis[beta-(N,N-dimethylamino)alkyl] ether from 2-(N,N-dimethylamino)alkanol and 2 - (N,N-dimethylamino)alkyl chloride without the need for prior formulation of sodium 2-(N,N-dimethylamino)alkoxide.

The present invention provides a process which comprises reacting an alkali metal hydroxide, a beta-(N,N-dimethylamino)alkanol, and a beta - (N,N - dimethylamino)alkyl chloride (or salt thereof) for a period of time sufficient to produce a bis[beta-(N,N - dimethylamino)alkyl]ether. The yields of ether product that are obtained by employing this process are high, which is particularly unexpected in view of the fact that water is generated during the reaction (by reaction of alcohol with alkali metal hydroxide). Thus, the invention provides an economical process for producing tertiary amine ethers having wide utility. The utility of the ethers is illustrated by their use as valuable catalysts for the reaction of organic isocyanates with active hydrogen-containing compounds to produce urethane foams and similar products whose wide utility is well known.

The beta-(N,N-dimethylamino)alkanols (for brevity, referred to below as the "alcohols") employed in the invention are illustrated by 2- (N,N - dimethylamino) ethanol and 1-(N,N-dimethylamino)-2-propanol. These compounds are produced by reacting dimethylamine with ethylene oxide or propylene oxide.

Illustrative of the beta - (N,N - dimethylamino)alkyl chlorides (for brevity, referred to below as the "alkyl chlorides") that are employed in the invention are 2-(N,N-dimethylamino)ethyl chloride and 1 - (N,N - dimethylamino)-2-propyl chloride. These alkyl chlorides can be produced by conventional methods such as by reacting the corresponding alcohols with a chlorinating agent such as thionyl chloride. Beta-(N,N - dimethylamino)alkyl chlorides are not stable compounds. For instance, 2-(N,N-dimethylamino)ethyl chloride undergoes self-condensation to form principally the bis-methochloride of 1,4-dimethylpiperazine. For this reason, these chlorides are preferably stored as the acid salts thereof (more preferably, as the hydrochlorides) in order to prevent the amino moiety from reacting with the chlorine moiety of the alkyl chloride. The acid can be neutralized immediately prior to using the chloride, or the acid salt itself can be used in the reaction as discussed below.

The process of the invention produces a bis[beta-(N,N-dimethylamino)alkyl] ether as the product. When the reactants are 2-(N,N-dimethylamino)ethanol and 2-(N,N-dimethylamino)ethyl chloride (or acid salt thereof), the product is bis[2-(N,N-dimethylamino)ethyl]ether. If the corresponding 2-propyl reactants are used, the product is bis[(N,N-dimethylamino)propyl] ether, and if a mixture of ethyl and 2-propyl reactants is used, a mixed ether is produced.

The third reactant employed in the process of the invention is an alkali metal hydroxide such as sodium hydroxide or potassium hydroxide. The hydroxide can be employed in the commercial flake form (having about 90 percent purity), as well as the purified pellet form.

The process of the invention comprises reacting the alcohol with the alkyl chloride (or acid salt thereof) in the presence of alkali metal hydroxide. Exactly stoichiometric quantities of the reactants can be employed. The stoichiometric proportions would be one mole of alcohol per mole of alkyl chloride (or acid salt thereof). One mole of alkali metal hydroxide would also be employed, or, in the case where the acid salt of the alkyl chloride was employed in place of the alkyl chloride per se, an additional quantity (sufficient to neutralize the acid) of the alkali metal hydroxide would be employed. It is preferred to employ an excess of the alcohol reactant. The excess alcohol acts as a coupling agent between various materials present in the reaction mixture with the result that a more homogeneous reaction mixture is obtained. The amount of excess alcohol needed to accomplish this desirable result is dependent to an extent upon the presence and proportion of an inert reaction medium, upon the exact nature of the reactants, and

---

[1] Fakstop et al. describe the preparation of sodium alkoxide by the addition of metallic sodium to a solution of N,N-dimethylethanolamine in toluene.

the like. Normally, an excess of at least 10 percent, preferably at least 20 percent, and more preferably at least 30 percent, of alcohol over the stoichiometric amount will help to provide a homogeneous reaction mixture. The upper limit of excess alcohol reactant that can be employed is limited only by economic considerations. It is rare, however, that more than 150 percent of excess alcohol will be employed.

It is preferred to carry out the reaction in an inert diluent. Diluents that can be employed should, preferably, possesses the following characteristics:

(1) Be good solvents for the alcohol and alkyl halide reactions;
(2) Be immiscible, or only slightly miscible, with water;
(3) Be inert under the reaction conditions employed; and
(4) Be of such a nature that separation from the ether product will not be difficult. (For instance, the boiling points of the diluent and the ether product should differ by an adequate amount and there should be no tendency of the diluent to form an azeotrope with the ether.)

Examples of useful diluents that meet the foregoing qualifications include benzene, toluene, xylene, ethylbenzene, anisole, heptane, octane, nonane, dibutyl ether, and the like. Toluene and other aromatic hydrocarbons are preferred. The amount of diluent can vary widely, for instance, from about 50 weight percent to about 500 weight percent, based upon weight of alcohol plus alkyl halide.

The reactants can be added to the reaction mixture in any order, although it is preferred to slowly add the alkyl halide to a stirred mixture of alcohol plus alkali metal hydroxide. The reaction is carried out at an elevated temperature and for a period of time sufficient to produce the amine ether product. The exact reaction temperature employed can vary over a fairly wide range, for instance, from about 20° C. to about 150° C., and preferably from about 80° C. to about 120° C. The reaction time can vary from about 0.5 hour to about 10 hours, and preferably, from about 4 to about 8 hours.

Atmospheric pressure is usually employed, although the reaction can be carried out at sub-atmospheric or super-atmospheric pressure if desired. Conventional equipment can be used. The equipment can be constructed from standard materials that are resistant to corrosion from the alkali and/or acid that is present in the reaction mixture.

The ether product is recovered by conventional procedures such as by first filtering or decanting to remove the salt (i.e., sodium or potassium chloride) by-product, flash distillation to remove solvent, and then fractional distillation to separate the ether from unreacted starting material.

The following examples illustrate the invention:

EXAMPLE 1

(A) Sodium hydroxide, 50 percent aqueous (240.0 g.; 3.0 moles) was slowly added with stirring to a solution of 1-chloro-2-dimethylaminoethane hydrochloride (288.1 g.; 2.0 moles) in water (180 cc.). The temperature of the mixture was kept below 20° C. during the sodium hydroxide addition. The mixture was extracted once with toluene (250 cc.) and the toluene extract was dried by stirring it with solid sodium hydroxide (50.0 g.) for 10 minutes. After removal of the sodium hydroxide by filtration the toluene solution of 1-chloro-2-dimethylaminoethane was employed with minimum delay in the condensation reaction.

(B) Sodium hydroxide (pellets) (80.0 g.; 2.0 moles) was added to a solution of N,N-dimethylethanolamine (241.5 g.; 2.71 moles) in toluene (350 cc.) and the mixture was refluxed with stirring. A homogeneous solution resulted after about one minute of refluxing.

To the foregoing stirred refluxing solution was added the toluene solution of 1-chloro-2-dimethylaminoethane from (A). The rate of addition was regulated to take about 30 minutes. Refluxing with stirring continued after the addition had been completed and was continued for 6 hours from the point. During the reaction, the kettle temperature progressively declined from 111° to 95° C.

After being cooled to about 40° C., the reaction product was filtered through a kieselguhr (Hyflo)-coated filter; the residue was washed twice with toluene and the washings were combined with the filtrate. Most of the toluene was stripped from the solution through a short column and at somewhat reduced pressure (∼300 mm.). Distillation of the residue at 10 mm. and with a reflux ratio of 3 to 1 through a column having an efficiency of about 9 theoretical plates gave the desired amine ether product as a fraction boiling at 74° C. The yield was 214.4 g. which amounted to 67 percent based on the chloro-2-dimethylaminoethane hydrochloride.

The bis(2-dimethylaminoethyl)ether product had a refractive index $n_D^{20}$ of 1.4309 and a total alkalinity and tertiary amine content of 12.42 and 12.51 meq./g., respectively. The theoretical total alkalinity and tertiary amine content is 12.48 meq./g.

EXAMPLE 2

Sodium hydroxide (pellets) (80.0 g.; 2.0 moles) was added to a solution of N,N-dimethylethanolamine (120.8 g.; 1.355 moles) in toluene (200 cc.) and the mixture was refluxed with stirring. Most of the sodium hydroxide had dissolved after 10 minutes but the solution was not homogeneous; there was a small amount of lower layer.

The solution was cooled to 75° C. whereupon 1-chloro-2-dimethylaminoethane chloride hydrochloride (144.1 g.; 1.0 mole) was added in 3 approximately equal portions over a 30 minute period. Evolution of heat was moderate during the chloride addition.

The mixture was refluxed with stirring for 6 hours after the chloride addition had been completed. During the reaction the kettle temperature progressively declined from 106° C. to 96° C.

After cooling the reaction product to room temperature, the liquid was decanted from the sodium chloride. The solid residue was washed three times with toluene (75 cc. portions) and the washings combined with the liquid product. Most of the toluene was stripped from the solution through a short column and at somewhat reduced pressure (∼300 mm.). Distillation of the residue at 10 mm. and with a reflux ratio of 3 to 1 through a column having an efficiency of about 9 theoretical plates gave the amine ether product as a fraction boiling at 73° C. to 75° C. The yield was 87.6 grams which amounted to 54.8 percent based on the 1-chloro-2-dimethylaminoethane hydrochloride.

The bis (2-dimethylaminoethyl)ether product had a refractive index $n_D^{20}$ of 1.4300 and a total alkalinity and teritary amine content of 12.42 and 12.14 meq./g., respectively. The theoretical total alkalinity and teritary amine content is 12.48 meq./g.

EXAMPLE 3

Potassium hydroxide (pellets, 85%) (132.0 g; 2.0 moles) was added to a solution of N,N-dimethyl-1-amino-2-hydroxypropane (309.5; 3.0 moles) in toluene (350 cc.) and the mixture was refluxed with stirring. Most of the potassium hydroxide had dissolved after about one hour.

To the foregoing stirred refluxing solution was added a toluene solution of 1-chloro-2-dimethylaminoethane prepared according to procedure (A) in Example 1 from 2.0 moles of the hydrochloride. The rate of addition was regulated to take about 30 minutes. Refluxing with stirring was continued for 6 hours after the addition had been completed. During the reaction the kettle temperature progressively declined from 113 to 90° C.

After being cooled to 50° C. the reaction product was filtered through a kieselguhr (Hyflo)-coated filter; the residue was washed twice with toluene and the washings were combined with the filtrate. Distillation of the mixture through a column having an efficiency of about 9 theoretical plates gave 2-(N,N-dimethylamino)ethyl 2-(N,N-dimethylamino)-1-methylethyl ether (190.6 g.) as a fraction boiling at 75 to 78° C. at 10.0 mm.

The amino-ether had a total alkalinity and tertiary amine content of 11.56 and 11.51 meq./g. respectively. The theoretical total alkalinity and tertiary amine content is 11.48 meq./g.

EXAMPLE 4

Potassium hydroxide (pellets, 85%) (132.0 g.; 2.0 moles) is added to a solution of N,N-dimethyl-1-amino-2-hydroxypropane (309.5 g. 3.0 moles) in toluene (350 cc.) and the mixture is refluxed with stirring.

To the foregoing stirred refluxing solution is added a toluene solution of N,N-dimethyl-1-amino-2-chloropropane (prepared from 2.0 moles of N,N-dimethyl-1-amino-2-hydroxypropane) over a period of about 30 minutes. Refluxing is continued fro 6 hours after the addition has been completed.

Distillation of the reaction product after removal of the salt by filtration affords bis[1-methyl-2-(N,N-dimethylamino)-ethyl]ether as a fraction boiling at 81° C. to 87° C. at 12 mm.

What is claimed is:

1. Process which comprises reacting:
   (a) beta-(N,N-dimethylamino)alkanol, the said alkanol having from 2 to 3 carbon atoms,
   (b) beta-(N,N-dimethylamino)alkyl chloride, the said alkyl having from 2 to 3 carbon atoms, and
   (c) alkali metal hydroxide, at a temperature of from about 80° to 150° C., to produce a bis[beta-(N,N-dimethylamino)alkyl] ether.

2. The process of claim 1 wherein the reactants are:
   (a) 2-(N,N-dimethylamnio)ethanol,
   (b) 2-(N,N-dimethylamino)ethyl chloride, and
   (c) sodium hydroxide.

3. The process of claim 1 wherein the alkali metal hydroxide is sodium hydroxide or potassium hydroxide.

4. The process of claim 1 wherein said process is carried out in the presence of a 10 to 150 percent excess of said beta-(N,N-dimethylamino)alkanol.

5. The process of claim 1 wherein the reaction time is from about 0.5 to about 10 hours.

6. The process of claim 1 wherein said process is carried out in an inert, liquid diluent.

References Cited

Volynskii et al., Chem. Ab., vol. 63, July 1965, p. 1689g (original Zh. Organ. Khim, 1(3), March 1965, 489–91).

CHARLES B. PARKER, Primary Examiner

R. L. RAYMOND, Assistant Examiner

U.S. Cl. X.R.

252—438; 260—77.5